US006982800B1

(12) United States Patent
Cavill et al.

(10) Patent No.: US 6,982,800 B1
(45) Date of Patent: Jan. 3, 2006

(54) APPARATUS AND METHOD FOR DATA MANAGEMENT WITHIN A PHOTOPRINTER

(75) Inventors: Barry Richard Cavill, Lexington, KY (US); William Henry Reed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 999 days.

(21) Appl. No.: 09/610,404

(22) Filed: Jul. 5, 2000

(51) Int. Cl.
*G06K 15/02* (2006.01)

(52) U.S. Cl. ...................................... 358/1.15; 358/1.6

(58) Field of Classification Search .......... 358/1.1–1.9, 358/1.11–1.18, 296; 348/207.2; 399/107; 710/1, 8; 382/305
See application file for complete search history.

(56) References Cited

U.S. PATENT DOCUMENTS 4,751,583 A * 6/1988 Levine ....................... 358/256
4,901,075 A 2/1990 Vogel
4,965,748 A * 10/1990 Chang et al. ............... 364/519
5,392,137 A 2/1995 Okubo
5,422,736 A 6/1995 Katayama
5,424,854 A 6/1995 Hashimoto
5,442,732 A 8/1995 Matysek et al.
5,487,138 A 1/1996 Rust et al.
5,568,270 A * 10/1996 Endo .......................... 358/298
5,588,092 A 12/1996 Komiya et al.
5,650,858 A 7/1997 Lund
5,706,102 A 1/1998 Okumura et al.
5,706,104 A 1/1998 Sugiura et al.
5,739,924 A 4/1998 Sano
5,778,159 A 7/1998 Ito
5,781,666 A 7/1998 Ishizawa et al.
5,793,937 A 8/1998 Chura et al.
5,828,815 A 10/1998 Herregods et al.
5,852,742 A 12/1998 Vondran, Jr. et al.
5,872,896 A 2/1999 Li et al.
5,884,014 A 3/1999 Huttenlocher et al.
6,034,785 A * 3/2000 Itoh .......................... 358/1.18
6,356,357 B1 3/2002 Anderson et al. .......... 358/1.17
6,504,960 B2 1/2003 Takahashi ................... 382/305
6,552,743 B1 4/2003 Rissman .................. 348/207.2

OTHER PUBLICATIONS

Lexmark, "Lexmark Photo Jetprinter 5770, Jan. 12, 2000."
Kodak, "Kodak PM 100 by Lexmark, Jan. 12, 2000."
Hewlett Packard, "HP PhotoSmart P100 Printer, Product Overview, Data Sheet, Feb. 23, 2000."
Hewlett Packard, "Hewlett Packard, Brochure, PhotoSmart P1000/P1100 Printers, Jul. 1999."
Hewlett Packard, "Hewlett Packard, Brochure, HP PhotoSmart P1000/P1100 Printers, Jul. 1999."
Canon, "Canon, PowerShot A50, Brochure, Japan."
Epson, "Epson (Color Imaging), Super Colario Photo CP-800, Brochure, Japan, Jun. 29, 1999."
Epson, "Epson (Color Imaging), printon, Full-Auto AI Photo Processor, Brochure, Japan, May 5, 1999."
Fuji, "Fujifilm (I & I—Imaging & Information), Digital Printer TX-70, Brochure, Japan, Oct. 1998."
Fuji, "Fujifilm (I & I—Imaging & Information), Digital Camera FinePix 1500, Brochure, Japan, Jun. 1999."

(Continued)

*Primary Examiner*—King Y. Poon
(74) *Attorney, Agent, or Firm*—Geoffrey L. Oberhaus

(57) ABSTRACT

Methods and a photoprinter are provided for performing more efficient data management on digital photographic images residing on a photoprinter. Alterations to the digital photographic image are processed at a first resolution while insertions of text and graphics onto the digital photographic image are processed at a second resolution.

20 Claims, 4 Drawing Sheets

OTHER PUBLICATIONS

Fuji, "Fujifilm (I & I—Imaging & Information), Digital Camera, FinePix 2900z, Brochure, Japan, Jul. 1999."
Kodak, "Kodak, DC240 Zoom, Brochure, Japan, Apr. 1999."
Kodak, "Kodak, DC280J Zoom, Brochure, Japan, Jul. 1999."
Konica, "Konica, Q-M200, Brochure, Japan."
Nikon, "Nikon, CoolPix950—CoolPix700, Brochure, Japan, May 21, 1999."
Olympus, "Olympus, CAMEDIA P-330, Brochure, Japan."
Olympus, "Olympus, CAMEDIA C-900Zoom, C-830L, P-330, Brochure, Japan."
Olympus, "Olympus, CAMEDIA C-2000ZOOM, Brochure, Japan."
Panasonic, "Panasonic, COOLSHOTIIMega LK-RQ1302, Brochure, Japan, Jun. 1999."
Ricoh, "Ricoh, RDC-5000, Brochure, Japan."
Sanyo, "Sanyo, LCD Digital Camera DSC-X110, Brochure, Japan, Feb. 1999."
Sony, "Sony, Digital Photo DPP-MS300, Brochure, Japan, Mar. 1999."
Sony, "Sony, Cyber-shot Digital Still Camera DSC-F55K, Brochure, Japan, Jun. 1999."
Toshiba, "Toshiba, Digital Still Camera, Allretto M4, Brochure, Japan."

* cited by examiner

APPARATUS AND METHOD FOR DATA MANAGEMENT WITHIN A PHOTOPRINTER

FIELD OF THE INVENTION

The present invention relates to apparatus and methods for providing data management within a photoprinter permitting data to be processed at a low and a high resolution.

BACKGROUND OF THE INVENTION

The advent of computers have fundamentally changed the way images can be stored, manipulate, and printed. Images can now be captured by digital devices, such as digital cameras and scanners, and stored digitally. A digitally stored image can then be transmitted, enhanced, and manipulated through computer programs. Moreover, as digital technology has improved and associated costs fallen, the resolution of the images captured by these devices continues to improve, and in many cases approaches or exceeds the quality of traditional film photography.

Traditionally, to use a digital image one needed a computer. The computer would be loaded with a variety of different programs to transmit, enhance and manipulate the digital images. To obtain a hard copy of the digital image, the user would direct the computer with an appropriate series of commands to send a "print job" from the computer to a traditional printer. While the traditional model works, it does have attendant shortcomings, such as being expensive, complicated, non-portable, etc. To combat such shortcomings, various manufacturers began offering stand-alone printers designed to print digital images. One example of a stand-alone printer is disclosed in U.S. patent application Ser. No. 09/164,500, filed on Oct. 1, 1998. While stand-alone printers have proven to have remarkable benefits over the traditional model, the present invention offers even more benefits and improvements for stand-alone printers.

Furthermore, stand-alone printers which desire to provide additional features to an end user, are forced to process the digital photographic image data within the photoprinter itself. Typically, a computer will process digital photographic image data and provide the enhanced digital photographic image to a printer in a high resolution format which the printer requires to create a printing swath for output. The digital photographic image enhancements are easily processed on a computer which comprises much larger storage space and processing power than a printer. Correspondingly, printers are significantly less expensive for a consumer to purchase than a computer because, printers have less memory and processing power. However, photoprinters are stand-alone printers which are capable of receiving a digital photographic image in its native resolution. Therefore, photoprinters cannot rely on digital photographic image enhancements to be performed by a computer.

Processing digital photographic image data at a high resolution such as 600 DPI (Dots Per Inch) requires significant memory and processing power by the photoprinter. Yet, since the photoprinter receives a digital photographic image directly, in a camera resolution (low resolution), it is desirable to perform digital photographic image enhancements at the native camera resolution. Camera image resolution is at a resolution significantly lower than a required printer output resolution. Thus, storage and processing of the digital photographic image at this lower resolution will free up significant memory and processor utilization within the photoprinter.

For example, a camera image resolution of 1024×768 for a digital photographic image, desired to be printed on an 8×10 inch page, would need to be expanded 6 times in both the length and the width directions of the page, resulting in a memory storage requirement of 36 times the size of the originally obtained camera image resolution. With a significantly larger digital photographic image, processing power is increased when attempting to manipulate or alter the digital photographic image. Adding storage and processing power to the photoprinter, will significantly increase the cost of the photoprinter and correspondingly the photoprinter would become less attractive to a prospective consumer.

Yet, consumers also desire to enhance their digital photographic images, by altering the image in some way such as inserting text or graphics onto the image, or creating a fade effect with a digital photographic image. Some enhancements are more optimally performed at lower resolutions, while other enhancements are more optimally performed at higher resolutions. For example, attempting to insert text messages or graphics onto a digital photographic image are best performed at higher printer resolutions. Performing text or graphic enhancements at a lower resolution will cause the inserted text or graphic to appear jagged and not blend with the digital photographic image. This jagged appearance would be immediately discernable to the viewer of the digital photographic image and perceived as poor quality. However, inserting text or graphics at the printer resolution will substantially decrease the jagged appearance and become more pleasing to the viewer of the digital photographic image. Inserting text and graphics at higher resolutions are not as costly as altering the original digital photographic image itself, since the size of text or graphics will be significantly less than the size of the digital photographic image.

Conversely, digital image enhancements which alter the digital photographic image such as fade effects, three dimensional effects, embossing effects, blurring effects, wind effects, and swirl effects are best performed at the lower camera resolutions. Altering the image at a lower resolution, significantly reduces memory and processor utilization as discussed above.

SUMMARY OF THE INVENTION

Accordingly, an object of the invention is to provide an improved data management within a photoprinter.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims. To achieve the foregoing and other objects and in accordance with the purpose of the present invention, methods and an apparatus are provided for enhancing digital photographic images on a photoprinter.

A method of processing digital photographic images on a photoprinter is provided, comprising receiving a digital photographic image at a first resolution on a printer and performing one or more first operations on the digital photographic image at the first resolution. Next, the digital photographic image is converted to a second resolution and one or more second operations are performed on the digital photographic image.

A photoprinter capable of processing a digital photographic image at two resolutions is provided, comprising a first memory and a second memory at a first and second resolution, respectively. Further, a controller performs one or more first operations on the digital photographic image in the first memory and one or more second operations on the digital photographic image in the second memory.

Finally, a method of providing data management on a photoprinter is provided, comprising receiving a digital photographic image at a first resolution and storing the digital photographic image in a first memory. Next, one or more first operations are performed on the digital photographic image in the first memory. The digital photographic image is converted to the second resolution, transferred and stored in a second memory where one or more second operations are preformed on the digital photographic image.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

The preferred embodiment of the present invention is written in C programming language and implemented in a real-time operating system environment.

Figure 1:
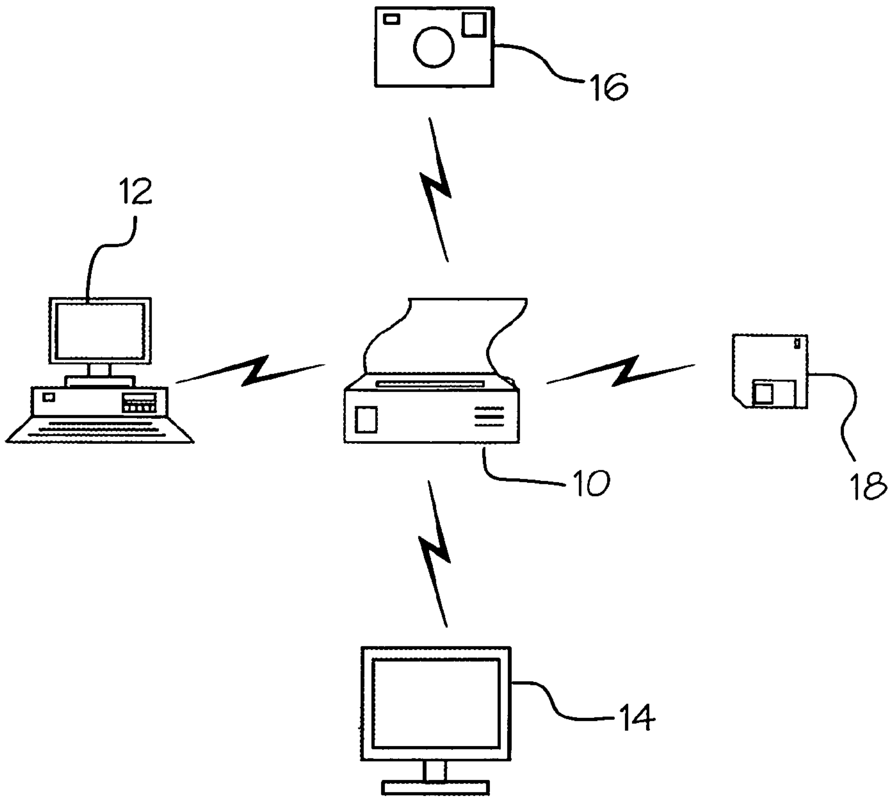
FIG. 1 depicts one embodiment of a photoprinter.

FIG. 1 illustrates one embodiment of a photoprinter 10. As used herein, a "photoprinter" refers to a stand-alone appliance for printing digital photographs onto a printable medium. A "digital photograph" is a photographic image captured by a light sensing electronic device (e.g., CCD, CMOS, CID, or the like) and converted into a digital file capable of being stored on a computer readable medium. The term "stand-alone" means that the printer is capable of processing and printing digital files independent of external host device, such as a computer, wherein "processing" means calculating a pixel pattern to be printed on the printable medium that represents the corresponding digital file (sometimes referred to as "ripping" or generating printing code). For instance, a printer is considered stand-alone if an external device merely passes a digital photograph to the printer and the printer contains the logic for processing and printing the digital photograph. The foregoing definitions are inclusive and open-ended. For example, a stand-alone printer may additionally be capable of receiving printing code from an external device. As a further example, a photoprinter may additionally be capable of processing and printing digital files other than digital photographs, such as text files, word processing files, HTML files, and the like.

The photoprinter 10 is operative to print digital photographs on printable media (e.g., paper, glossy film or photo paper, index cards, labels, envelopes, transparencies, coated paper, cloth, etc.). In one preferred embodiment, the photoprinter 10 works by transferring an ink (e.g., toner, dye, pigment, wax, carbon, etc.) onto a printable medium. For instance, the photoprinter 10 can employ conventional thermal ink jet technology, however, it is contemplated that the present invention can be adapted for use with other types of ink jet technologies, such as piezo ink jet. In addition, the present invention can be adapted for use with other printer technologies, such as electrophotography, dye diffusion, thermal transfer, and the like.

While the photoprinter 10 operates as a stand-alone printer, it can nevertheless communicate with a variety of external components, only a portion of which are illustrated in FIG. 1. In the present example, the photoprinter 10 can communicate to a computer 12 using any one of a variety of different communication links, such as parallel cables, serial cables, telephone lines, universal serial bus port "USB", firewire, bluetooth, fiber optics, infrared "IR", radio frequency "RF", network interface cards (e.g., Ethernet, token ring, etc.), and the like. The computer 12 can be any conventional or special purpose computer, such as a desktop computer, a tower computer, a micro-computer, a mini-computer, server, workstation, palmtop computer, notebook computer, hand-held computing device, or the like. Through the communication link, the photoprinter 10 can receive digital photographs from the computer 12 for processing and printing. In one embodiment, the computer 12 is programmed to generate printing code (e.g., via locally loaded print drivers) and the photoprinter 10 is capable of receiving the externally processed printing code for direct printing. As such, the photoprinter 10 would have dual functionality: a stand-alone printer as well as a more conventional printer for receiving commands from an external device.

In the present example, the photoprinter 10 can also communicate with an external display 14 (e.g., a television, monitor, LCD, or the like) using an appropriate communication link. In such a configuration, the photoprinter 10 can generate and send appropriate signals to present a user interface to operate the photoprinter 10 or preview digital photographs on the display 14. The photoprinter 10 also can communicate with a digital camera 16 using an appropriate communication link. Typically, a digital camera 16 includes one or more lenses that focus light into an image on a light sensing electronic device, and stores the image as a digital photograph. In one embodiment, the photoprinter 10 can retrieve, process and print digital photographs stored in the camera 16.

The photoprinter 10 can also communicate with a computer readable medium 18, shown here as a floppy diskette. A computer readable medium stores information readable by a computer, such as programs, data files, etc. As one with ordinary skill in the art will readily appreciate, a computer readable medium can take a variety of forms, including magnetic storage (such as hard drives, floppy diskettes, tape, etc.), optical storage (such as laser disks, compact disks, digital video disks "DVD", etc.), electronic storage (such as random access memory "RAM", read only memory "ROM", programmable read only memory "PROM", flash memory, memory sticks, etc.), and the like. Some types of computer readable media, which are sometimes described as being non-volatile, can retain data in the absence of power so that the information is available when power is restored.

The photoprinter 10 preferably interfaces with the computer readable medium 18 using an internal or external drive. As used herein, the term "drive" is intended to mean a structure which is capable of interfacing with (e.g., reading from and/or writing to) a computer readable medium. Naturally, suitable drives will vary depending upon the specific computer readable medium 18 being employed. In a preferred embodiment, the photoprinter includes first and second drives each adapted to receive a solid state flash memory card. The first and second drives are preferably both internal drives. Flash memory cards, due to their very small size and lightweight, are a highly portable computer readable medium which are electrically re-writable and are non-volatile. More preferably, the first and second drives are adapted to receive different types of flash memory cards, such as a NAND type of flash memory card (e.g., a SMART MEDIA card developed by Toshiba, Inc.) or a PCMCIA type of flash memory card (e.g., the COMPACTFLASH developed by SanDisk, Inc.).

Figure 2:
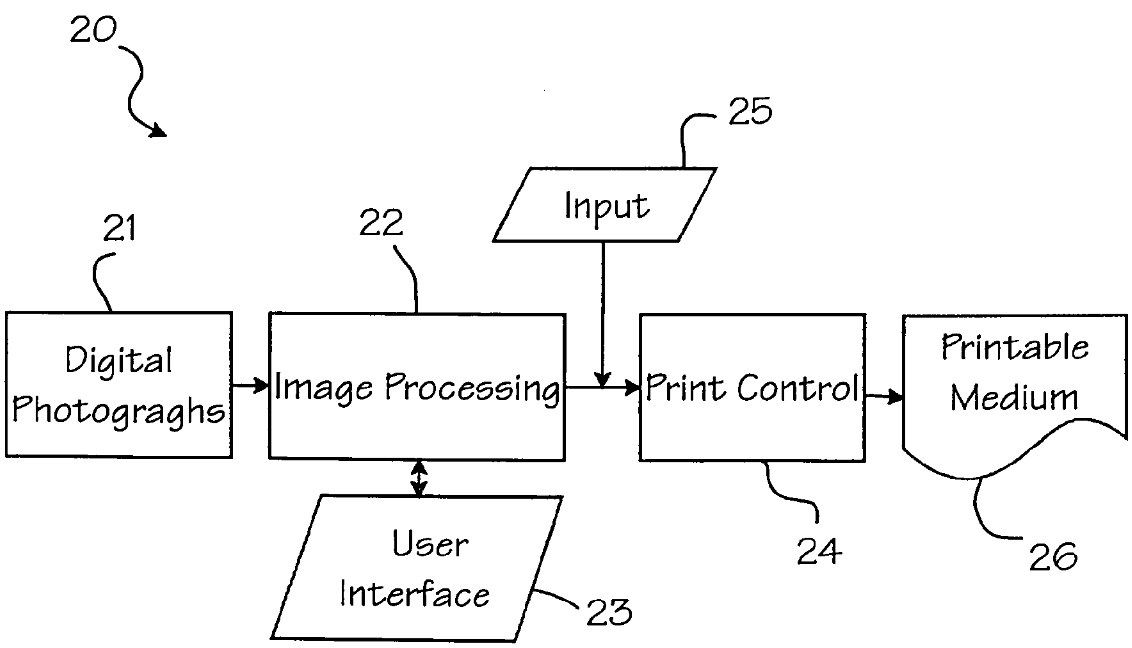
FIG. 2 depicts a preferred operational block diagram for a photoprinter.

FIG. 2 depicts a preferred operational block diagram 20 for the photoprinter 10. One or more digital photographs 21 are input to the image processing block 22, located internal to the photoprinter 10. The digital photographs 21 can be received from a variety of different sources, whether internal to the photoprinter 10 or from an external source via a drive, communications link, or the like. Furthermore, the digital photographs 21 can take any one of a variety of different file formats, whether raster, vector, or other format (e.g., GIF, TIFF, PCX, JPEG, EXIF, CIFF, JFIF, etc.).

The image processing block 22 is responsible for calculating a pixel pattern to be printed on the printable medium 26 that represents the corresponding digital photographs 21, sometimes referred to in the art as generating printing code. The image processing block 22 may optionally enhance the digital photographs 21. For instance, photo enhancement software, such as the PICTURE IQ software by Digital Intelligence, may be incorporated into the image processing 22. Further, image processing 22 may optionally include a variety of different resources to modify the printed rendition of the digital photographs 21, such as the addition of text, frames, templates, scaling, etc. Enhancements or resources may be implemented before and/or after the digital photographs 21 are converted to printing code. A user interface 23 is provided to allow a user to interact with and/or direct the image processing block 22 (e.g., controlling the enhancements and/or resources). The user interface 23 may be with integral to the photoprinter 10 or located on an external component. Preferably, however, the photoprinter 10 includes an LCD display with one or more buttons or other input devices. Optionally, the user interface 23 may take the form of a series of instructions accompanying the digital photographs 21, such as a digital print order format "DPOF".

The print code generated during image processing 22 is passed to the print control 24. In the cases where printing code is generated from an external source (e.g., computer 12), such printing code can be input 25 directly to the print control 24, thus bypassing the image processing block 22. The print control 24 is responsible for directing the physical transference of the pixel pattern represented by the printing code to the printable medium 26. The photoprinter 10 is preferably in the form of a thermal ink jet printer having one or more conventional thermal ink jet print heads. During printing, the print control 24 directs one or more motors to move the printable medium 26 longitudinally relative to the photoprinter 10 so that it is properly positioned for deposition of an ink pattern or swath. Once the printable medium 26 is in position, the print control 24 directs the print head to move along a conventional print head carriage in a direction transverse to the longitudinal direction while firing droplets of ink onto the surface of the printable medium 26. The print head may make one or more of these transverse passes to complete printing for the swath. After the swath is complete, the printable medium's 26 position is adjusted longitudinally for the printing of the next swath.

Figure 3:
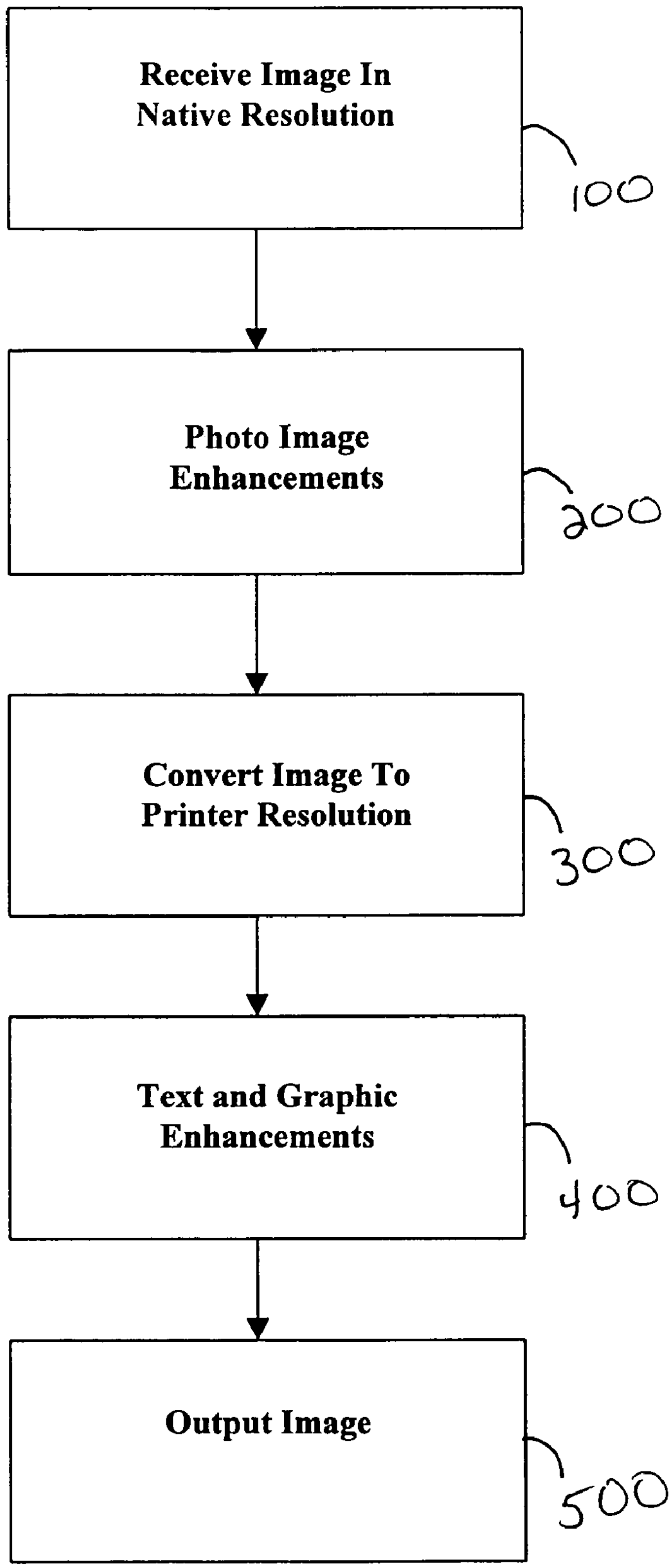
FIG. 3 depicts a flow diagram of processing data on a photoprinter.

FIG. 3 depicts a flow diagram of processing data on a photoprinter. In step 100 a digital photographic image is received by a photoprinter. This digital photographic image is preferably received from a digital camera at a camera resolution which is lower than the photoprinter's required output resolution. The digital photographic image is stored temporarily in volatile memory of the photoprinter. Once the digital photographic image is available on the photoprinter, at the lower camera resolution, a number of image alteration/enhancement operations are performed on the digital photographic image in step 200. These enhancements may include, by way of illustration only, fading the image, blurring the image, embossing the image, creating a three dimensional effect on the image, creating a wind effect on the image, and creating a swirling effect on the image.

As one skilled in the art will appreciate, the above mentioned image alteration/enhancement operations are more typically performed by a computer prior to a printer receiving an image. And, if the operations are performed on a printer, the operations are performed on a digital photographic image which is in a higher resolution and correspondingly requires substantial memory and processor utilization of the printer.

In step 300, the digital photographic image is converted to a higher printer resolution format. This conversion preferably pipes the digital photographic image from the lower resolution to the higher resolution, such that as a piece of the digital photographic image, residing in the lower resolution, is converted to a higher resolution, the storage in volatile memory which had previously been allocated to the lower resolution data is freed up for use by the photoprinter to store some of the converted higher resolution data. As one skilled in the art will appreciate, this will optimally utilize the volatile memory of the photoprinter and reduce memory requirements associated with double storing the digital photographic image at both a low and high resolution.

In step 400, operations relating to inserting text or graphics onto the digital photographic image are performed. The digital photographic image resides in the volatile memory of the photoprinter and is at a higher printer resolution. By way of illustration only, some of the text and graphical operations include adding descriptive text messages to the image, placing an art design on the image, and placing a picture frame design on the image. As one skilled in the art will appreciate, text and graphical insertions on an image are preferably done at a higher resolution to avoid a jagged appearance. Furthermore, processing text and graphics require less memory and processor overhead than processing the digital photographic image. Lastly, in step 500, the digital photographic image is outputted from the photoprinter.

Figure 4:
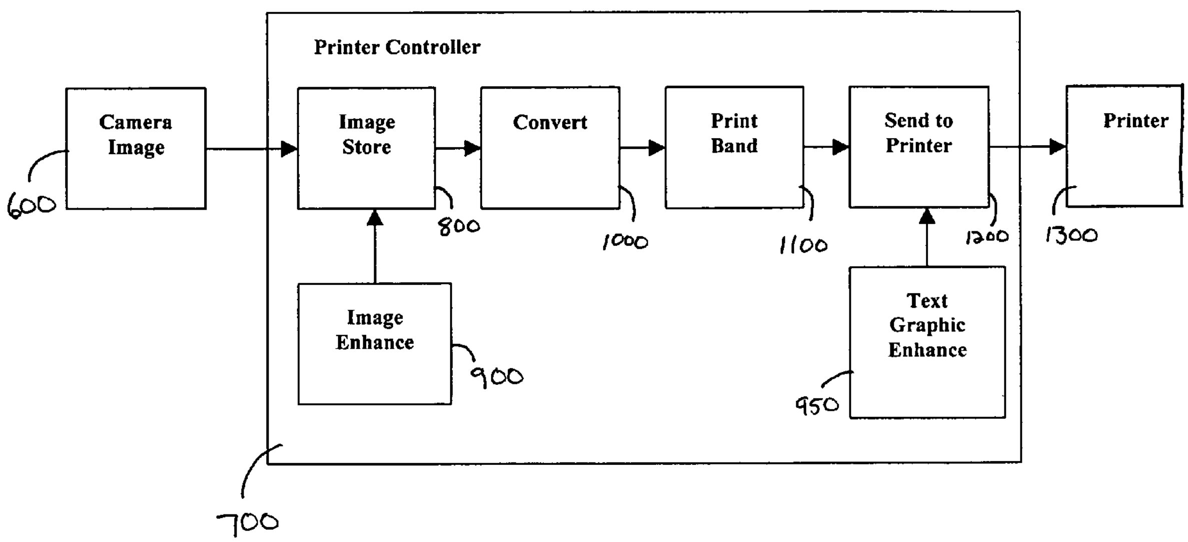
FIG. 4 depicts a photoprinter of the present invention.

FIG. 4 depicts a photoprinter comprising a printer controller 700 and a printer 1300. The printer controller 700 is a software logic residing in the photoprinter's volatile memory during operation and residing in the non-volatile memory when the photoprinter is powered down.

Initially, a camera image 600 is transmitted or detected by the controller 700. The camera image 600 is temporarily stored in a logical segmentation of the volatile memory referred to as an image storage buffer 800. While the camera image 600 is in the image storage buffer 800, photo image enhancement operations 900 are performed on the camera image 600. As previously discussed, these operations typically alter the image and are normally memory and processor intensive operations due to the large size of an image stored in a high resolution format. However, in the present example the operations are performed on the camera image 600 while the camera image 600 remains in its native (low)

resolution. Accordingly, substantial memory and processor resources are freed up by the controller 700 to perform other operations being requested of the photoprinter.

The low resolution camera image 600 is converted to a higher printer resolution by a software conversion 1000. The conversion 1000 pipes the lower resolution camera image 600 to a higher resolution as described above with FIG. 3. The controller 700 will logically segment a portion of the volatile memory to store the higher resolution image in a print band buffer 1100. Text and graphic enhancement operations 950 may then be applied to the higher resolution image to improve print output quality, as discussed above. The higher resolution image is then sent 1200 to the printer 1300 where it is outputted to a paper medium. However, as one skilled in the art will appreciate the higher resolution image could easily be converted back to a lower resolution and stored on a computer readable medium.

Figure 5:
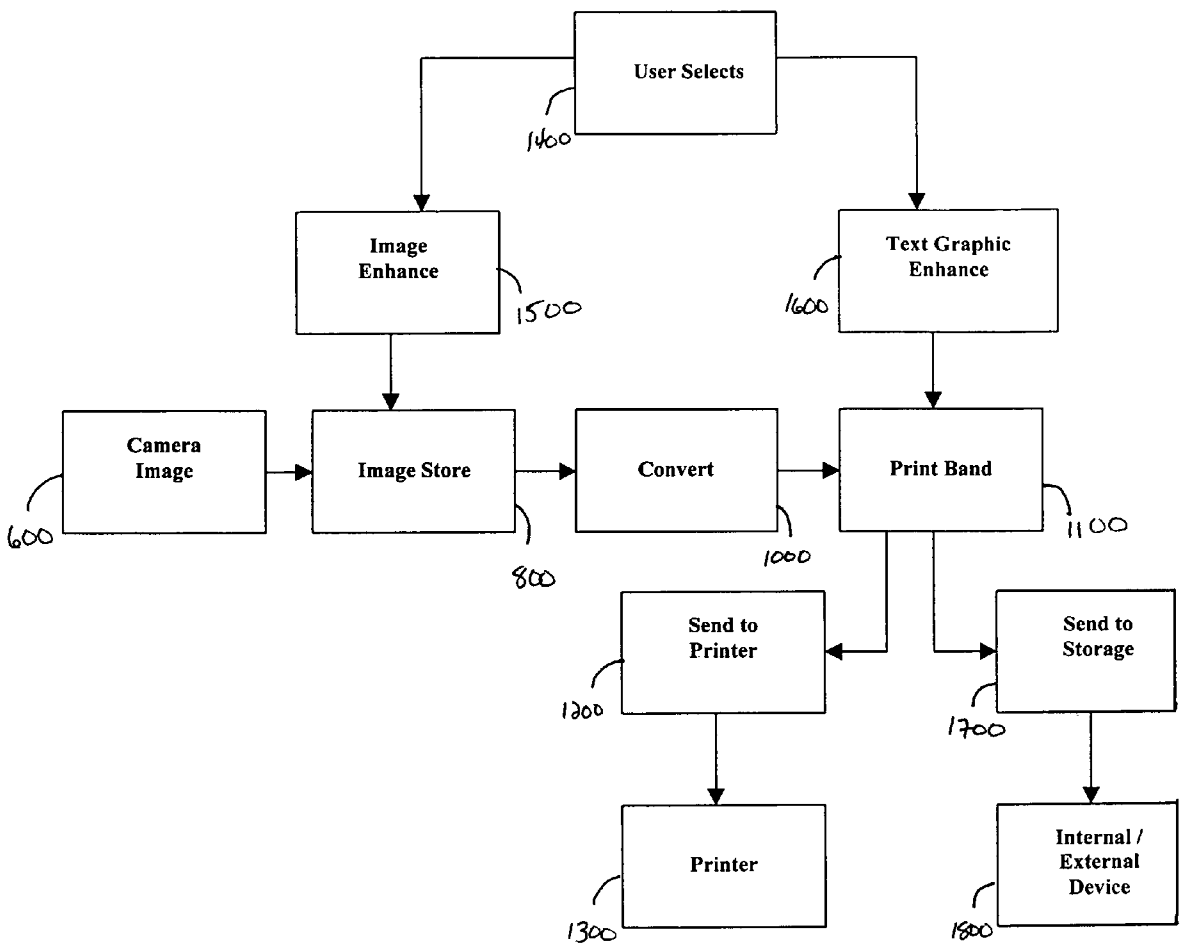
FIG. 5 depicts a flow diagram of providing data management on a photoprinter.

FIG. 5 depicts a flow diagram for providing data management on a photoprinter. FIG. 5 permits a user to select, in step 1400, via a user display interfaced to a photoprinter, photo image enhancement operations 1500 and/or text and graphic enhancement operations 1600. The photoprinter's controller software will then determine which operations are to be performed on a camera image 600 residing in the image storage buffer 800 and which operations are to be performed on a higher resolution of the camera image 600 residing in the print band buffer 1100. As previously discussed, the camera image 600 is converted and piped from the image storage buffer 800 to the print band buffer 1100 by a software conversion process. After enhancements to the image have concluded the image may be sent 1200 to a printer mechanism 1300 or sent to a computer readable medium 1700 associated with some internal/external device 1800.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

What is claimed is:

1. A method of processing a digital photographic image on a photoprinter, comprising:
- receiving a digital photographic image in a first format on a printer;
- performing one or more first operations on the digital photographic image in the first format;
- converting the digital photographic image to a second format; and
- performing one or more second operations on the digital photographic image in the second format.

2. The method of claim 1, further comprising:
- storing the digital photographic image while in the first format in a image-storage buffer; and
- storing the digital photographic image while at the second format in a print-band buffer.

3. The method of claim 1, further comprising:
- rendering the digital photographic image for output on the printer.

4. The method of claim 1, wherein the first operations include one or more photographic image alterations.

5. The method of claim 1, wherein the second operations include:
- one or more text insertions onto the digital photographic image; and
- one, or more graphical insertions onto the digital photographic image.

6. The method of claim 1, wherein the first format is a camera resolution format.

7. The method of claim 1, wherein the second format is a printer resolution format.

8. The method of claim 1, further comprising:
- selecting means for selectively performing a third operation on the digital photographic image in the first format.

9. The method of claim 1, further comprising:
- selecting means for selectively performing a fourth operation on the digital photographic image in the second format.

10. A photoprinter capable of processing a digital photographic image at two resolutions, comprising:
- a first memory in a first format;
- a second memory in a second format; and
- a controller wherein the controller performs one or more first operations on a digital photographic image in the first memory and one or more second operations on the digital photographic image in the second memory.

11. The photoprinter of claim 10, further comprising:
- means for converting the digital photographic image in the first memory in the first format to the second format for storage in the second memory.

12. The photoprinter of claim 10, further comprising:
- rendering the digital photographic image for output to a paper medium.

13. The photoprinter of claim 10, further comprising:
- rendering the digital photographic image for output to a computer readable medium.

14. The photoprinter of claim 10, wherein the first format is a native resolution format of the digital photographic image and the second format is a printer resolution format.

15. The photoprinter of claim 10, wherein the first operations include one or more digital photographic image alterations.

16. The photoprinter of claim 10, wherein the second operations include one or more text insertions and one or more graphical insertions onto the digital photographic image.

17. A method of providing data management on a photoprinter comprising:
- receiving a digital photographic image in a first format on a printer;
- storing the digital photographic image in a first memory in the first format;
- performing one or more first operations on the digital photographic image in the first memory;
- converting the digital photographic image to a second format; transferring and storing the digital photographic image in the second format to a second memory; and
- performing one or more second operations on the digital photographic image in the second memory.

18. The method of claim 17, further comprising:
- rendering the digital photographic image for output.

19. The method of claim 17, wherein the first format is at a lower resolution format than the second format.

20. The method in claim 17, wherein the first operations include digital photographic image alterations and the second operations include text and graphical insertions on the digital photographic image.

* * * * *